(12) United States Patent
Lu et al.

(10) Patent No.: US 9,071,633 B2
(45) Date of Patent: *Jun. 30, 2015

(54) METHODS, SYSTEMS, AND COMPUTER PROGRAM PRODUCTS FOR STORING COMMUNICATION SESSION DATA AT A NETWORK INTERFACE MODULE

(71) Applicant: GENBAND US LLC, Plano, TX (US)

(72) Inventors: David Z. Lu, Dallas, TX (US); San-Qi Li, Plano, TX (US)

(73) Assignee: GENBAND US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,500

(22) Filed: Feb. 3, 2014

(65) Prior Publication Data

US 2014/0215002 A1    Jul. 31, 2014

Related U.S. Application Data

(63) Continuation of application No. 11/580,224, filed on Oct. 12, 2006, now Pat. No. 8,681,776.

(51) Int. Cl.
*H04L 29/06* (2006.01)
*H04L 29/08* (2006.01)
*H04L 12/743* (2013.01)

(52) U.S. Cl.
CPC ........ *H04L 67/1097* (2013.01); *H04L 45/7453* (2013.01); *H04L 65/605* (2013.01); *H04L 65/608* (2013.01); *H04L 65/103* (2013.01); *H04L 67/06* (2013.01)

(58) Field of Classification Search
None
See application file for complete search history.

(56) References Cited

U.S. PATENT DOCUMENTS

| | | |
|---|---|---|
| 6,639,915 B1 | 10/2003 | Tsztoo et al. |
| 6,678,250 B1 | 1/2004 | Grabelsky et al. |
| 6,757,742 B1 | 6/2004 | Viswanath |
| 6,757,752 B2 | 6/2004 | Bae |
| 6,954,463 B1 | 10/2005 | Ma et al. |
| 7,221,660 B1 | 5/2007 | Simonson et al. |
| 7,272,153 B2 | 9/2007 | Cline |
| 7,380,011 B2 | 5/2008 | Li et al. |
| 7,453,893 B2 | 11/2008 | Li et al. |
| 8,681,776 B2 * | 3/2014 | Lu et al. .................. 370/352 |
| 2002/0136162 A1 | 9/2002 | Yoshimura et al. |
| 2003/0145077 A1 | 7/2003 | Khan et al. |

(Continued)

FOREIGN PATENT DOCUMENTS

WO    WO 2006/026726 A2 *    3/2006

OTHER PUBLICATIONS

Notice of Allowance and Fee(s) Due for U.S. Appl. No. 11/580,224 (Oct. 31, 2013).

(Continued)

*Primary Examiner* — Brian Roberts
(74) *Attorney, Agent, or Firm* — Jenkins, Wilson, taylor & Hunt, P.A.

(57) ABSTRACT

The subject matter described herein includes methods, systems, and computer program products for storing communication session information at a network interface module. One method described herein includes receiving a plurality of RTCP packets associated with a communication session at a network interface module. RTCP information is extracted from at least one of the packets. The extracted RTCP information is stored in memory local to the network interface module.

27 Claims, 4 Drawing Sheets

(56) References Cited

U.S. PATENT DOCUMENTS

| | | |
|---|---|---|
| 2003/0212809 A1 | 11/2003 | Wu et al. |
| 2004/0047290 A1 | 3/2004 | Komandur et al. |
| 2004/0066753 A1 | 4/2004 | Grovenburg |
| 2004/0125751 A1 | 7/2004 | Vangal et al. |
| 2004/0170163 A1 | 9/2004 | Yik et al. |
| 2005/0074017 A1 | 4/2005 | Qian et al. |
| 2005/0083844 A1 | 4/2005 | Zhu et al. |
| 2006/0062208 A1 | 3/2006 | Li et al. |

OTHER PUBLICATIONS

Extended European Search Report for European Application No. 07852713.2 (Apr. 19, 2013).
Final Office Action for U.S. Appl. No. 11/580,224 (Feb. 14, 2013).
Non-Final Official Action for U.S. Appl. No. 11/580,224 (Sep. 27, 2012).
Second Office Action for Chinese Patent Application No. 200780045490.5 (Jun. 19, 2012).
Final Official Action for U.S. Appl. No. 11/580,224 (Apr. 16, 2012).
Non-Final Official Action for U.S. Appl. No. 11/580,224 (Oct. 20, 2011).
First Office Action for Chinese Patent Application No. 200780045490.5 (Aug. 24, 2011).
Non-Final Official Action for U.S. Appl. No. 11/580,224 (Feb. 22, 2011).
Final Official Action for U.S. Appl. No. 11/580,224 (Apr. 23, 2010).
Non-Final Official Action for U.S. Appl. No. 11/580,224 (Sep. 15, 2009).
Interview Summary for U.S. Appl. No. 11/580,224 (Sep. 8, 2009).
Communication of European Publication Number and Information on the Application of Article 67(3) EPC for European Patent No. 2082547 (Jul. 1, 2009).
Non-Final Official Action for U.S. Appl. No. 11/580,224 (Jan. 27, 2009).
Response to Rule 312 Communication for U.S. Appl. No. 11/109,337 (Oct. 17, 2008).
Notice of Allowance and Fee(s) Due for U.S. Appl. No. 11/109,337 (Jul. 15, 2008).
Notification of Transmittal of the International Search Report and the Written Opinion of the International Searching Authority, or the Declaration for International Application No. PCT/US07/21832 (May 1, 2008).
Non-Final Official Action for U.S. Appl. No. 11/109,337 (Mar. 5, 2008).
Schulzrinne et al., "RTP: A Transport Protocol for Real-Time Applications," RFC 3550, pp. 1-98 (Jul. 2003).
Malkin et al., "F.Y.I. on F.Y.I.," RFC 1150, pp. 1-4 (Mar. 1990).

* cited by examiner

METHODS, SYSTEMS, AND COMPUTER PROGRAM PRODUCTS FOR STORING COMMUNICATION SESSION DATA AT A NETWORK INTERFACE MODULE

PRIORITY CLAIM

This application is a continuation of U.S. patent application Ser. No. 11/580,224, filed Oct. 12, 2006, the disclosure of which is incorporated herein by reference in its entirety.

TECHNICAL FIELD

The subject matter described herein relates to collecting information associated with a communication session in a network. More particularly, the subject matter described herein relates to methods, systems and computer program products for storing communication session information at a network interface module.

BACKGROUND

In communications networks, when a plurality of packets is sent from an origin to a destination for a shared purpose, the packets are collectively called a session. Network carriers may be interested in statistical data related to sessions traversing their networks. This data, hereinafter referred to as session information, can be collected by network elements that route and/or process packets belonging to network sessions. Examples of network elements that may perform such routing or processing include media gateways (MGs) and session border controllers (SBCs). Session information may be contained in portions of packets belonging to each session and therefore can be collected by extracting these portions from network packets associated with a communication session. For example, in communications sessions, such as voice over Internet protocol (VoIP)-to-VoIP sessions, which utilize real time transport control protocol (RTCP) packets to control the session, at least five types of session information are contained in each packet.

First, the session information data field, referred to as the sender's packet count, stores the total number of real time transport protocol (RTP) packets transmitted by the sender since the session was initiated. This count is reset at the beginning of each session.

Second, the sender's octet count data field stores the total number of RTP payload octets transmitted by the sender since the beginning of the session. The sender's octet count includes 32-bits and may be used to estimate the average payload data rate.

Third, the fraction lost data field stores the number of packets lost divided by the number of RTP packets expected. This number is expressed as a fixed point number with the binary point at the left edge of the field.

Fourth, the cumulative number of packets lost data field stores the total number of RTP packets belonging to a single source that were lost since the session began. The number of lost packets is equal to the expected number of packets minus the number of packets received, where the received packets include duplicate and late packets.

Fifth, the interarrival jitter data field stores a mathematical estimate of the variance in the arrival times of RTP packets. This jitter is measured as the difference between the spacing of a sender's RTP packets and the spacing of the packets when the destination receives them. This can also be viewed as the difference between the transit times of individual packets in an RTP packet stream.

Typically, session information generated by a communication session is sent to a centralized central processing unit (CPU) or one or more digital signal processors (DSPs) of a network node, such as a media gateway, for processing. In addition to processing session information, these CPUs and DSPs perform tasks such as call set-up and tear-down and codec conversion. The primary functions just described are resource intensive, and thus limit the processing resources these CPUs and DSPs can dedicate to also processing session data.

One type of network element that may receive RTCP information is a media gateway. A media gateway (MG) is a mediation device that translates communications traffic between different networks, such as public switched telephone network (PSTN) and Internet protocol (IP) networks. Media gateways receive incoming packets and process and/or route the packets. For example, media gateways can receive packets belonging to a VoIP session from an IP network, convert the voice information in the packets to a different codec, and forward the voice information to a PSTN network. Media gateways can also receive network packets from an IP network and route the packets to another IP network if codec conversion is needed. In addition to these core functions, one or more resources in a MG, such as the DSPs, can collect and analyze session information relating to the network traffic it processes.

Another type of network elements that may receive RTCP information is a session border controller (SBC). An SBC is a device that manages VoIP calls at the border of IP networks by managing the control and media signaling associated with setting up, conducting, and tearing down VoIP calls. Additionally, SBCs may enforce firewall permissions or quality of service (QoS) protocols. SBCs may also collect and analyze session information for the network traffic it processes. Both MGs and SBCs currently collect and analyze communications session information remotely using a central CPU or one or more DSPs.

Current methods and systems for collecting and analyzing communication session information that forward packets to a remote processor have several disadvantages. First, the time required to forward packets via a switching fabric or a communication bus to remote processors limits the number of packets per second a MG or SBC can process, and thus limits their scalability. Second, in the event of a link failure between the network interface module, where packets are received, and the remote processor where the packets' session information is collected and analyzed, no session information can be collected until the link returns to availability. Third, because remote processors in current systems also perform tasks vital to the operation of the network element, such as call set-up and tear-down and codec conversion, the increased load dedicated to processing session information can degrade the performance of these core operations. Accordingly, a need exists for improved methods, systems, and computer program products for managing, processing, and storing communication session information.

SUMMARY

The subject matter described herein includes methods, systems, and computer program products for storing communication session information at a network interface module. One method described herein includes receiving a plurality of RTCP packets associated with a communication session at a network interface module. RTCP information is extracted from at least one of the packets. The extracted RTCP information is stored in memory local to the network interface module.

According to another aspect, the subject matter described herein includes a system for storing communication session information at a network interface module. The system includes a plurality of voice processing resources for processing voice packets associated with communication sessions and for sending RTCP packets to and receiving RTCP packets from a network. A plurality of network interfaces sends and receives the voice and RTCP packets to and receives the RTCP packets from the network. At least one of the network interfaces includes an RTCP caching module and an RTCP cache for caching RTCP information from received packets.

The subject matter described herein may be implemented using a computer program product comprising computer executable instructions embodied in a computer readable medium. Exemplary computer readable media suitable for implementing the subject matter described herein include chip memory devices, disc memory devices, application specific integrated circuits, programmable logic devices, and downloadable electrical signals. In addition, a computer program product that implements a subject matter described herein may reside on a single device or computing platform or maybe distributed across multiple devices or computing platforms.

BRIEF DESCRIPTION OF THE DRAWINGS

The subject matter described herein will now be explained with reference to the accompanying drawings of which.

DETAILED DESCRIPTION OF THE INVENTION

Systems, methods and computer program products for locally storing and updating communication session information at a network interface module are described herein which offload the collection and storage of session information from remote processors and locally cache the information at the network interface module. The subject matter described herein is illustrated with reference to the following figures, which include network elements, which are exemplary operating environments for locally caching communication session information as described herein.

Figure 1:
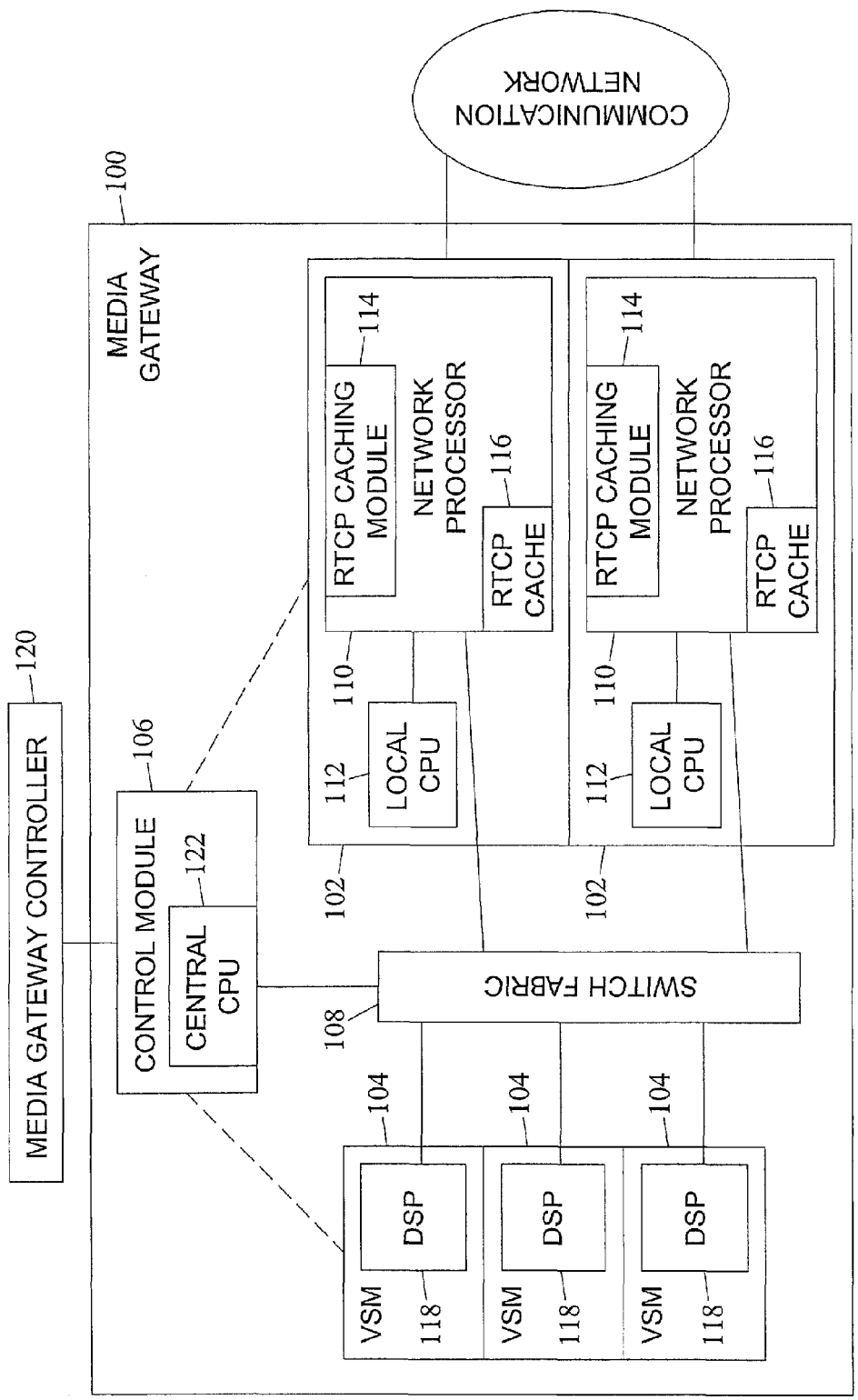
FIG. 1 is a block diagram of a media gateway including a network interface module configured to locally cache RTCP session information according to an embodiment of the subject matter described herein.

FIG. 1 is a schematic diagram illustrating an exemplary network element for collecting and storing session information. In particular, FIG. 1 illustrates a media gateway 100 according to an embodiment of the subject matter described herein. Referring to FIG. 1, media gateway 100 includes a plurality of network interface modules (NIMs) 102, a plurality of voice server modules (VSMs) 104, and a control module 106, which may be a connected via switch fabric 108. Each VSM 104 may process VoIP and TDM voice sessions that include a leg in an IP or PSTN network. For example, each voice server module 104 may include a DSP 108, a VoIP chip, a voice over ATM chip, a time slot interconnect chip, and a CPU. Each VSM may receive and process RTCP packets for controlling RTP sessions that are terminated by each VSM 104.

Each network interface module 102 may be configured to locally cache RTCP session information according to an embodiment of the subject matter described herein. In one implementation, each network interface 102 includes a network processor 110 and a local CPU 112. Network processor 110 performs packet forwarding functions, such as forwarding incoming packets to the appropriate VSM 104. Network processor 110 also forwards outbound media packets over the communications network. Local CPU 112 controls the overall operation of each network interface module 102.

In the illustrated example, network processor 110 includes or implements an RTCP caching module 114 and an RTCP cache 116. RTCP caching module 114 may cache RTCP information from received packets in storage available in RTCP cache 116. The RTCP information may include any information from the RTCP portion of a packet, including the five types of RTCP information described above. RTCP caching module 114 may identify a session with which an RTCP packet is associated and store the RTCP information associated with the packet in cache 116 in an area allocated for that session. The Network Processor module 110 may include an embedded CPU to offload RTCP caching burden from the central or local CPU. The local CPU on the network interface module may be optional if an embedded CPU exists in the Network Processor module. Exemplary operations that may be performed by RTCP caching module 114 and RTCP cache 116 will be described in more detail below.

Although in the illustrated embodiment, RTCP caching module 114 and RTCP cache 116 are implemented using network processor 110, the subject matter described herein is not limited to such an embodiment. RTCP caching module 114 may be implemented using any processing resource local to a network interface 102, and RTCP cache 116 may be implemented using any storage resource local to a network interface 102. For example, RTCP caching module 112 may be implemented using a local CPU 112, and RTCP cache 116 may be implemented using memory accessible by local CPU 112.

Each VSM 104 may perform codec conversion and other voice processing for sessions, such as VoIP-to-VoIP and VoIP-to-TDM sessions. Each VSM 104 may include a digital signal processor (DSP) 118 that is optimized for such processing. Each VSM 104 may be reachable through packet switch fabric 108, and thus is referred to as a remote processor relative to each NIM 102. Multiple sessions may be assigned to the same VSM 104, where each session is associated with a different IP address and user datagram protocol (UDP) port number combination. In one exemplary implementation, VoIP sessions for incoming packets may be identified by the destination IP address and UDP port, which correspond to an IP address and UDP port used by one of VSMs 104. Remote IP address and UDP port information in received packets may also be used to identify the session with which a received packet belongs.

Control module 106 manages the data flow in media gateway 100 and communicates with media gateway controller 120 to set up and tear down calls. Control module 106 may include a central CPU 122 which may be used for processing session information. Central CPU 122 is reachable through packet switch fabric 108 and is thus referred to as a remote processor relative to network interfaces 102. Performing RTCP caching at the network interfaces reduces the processing required to be performed by CPU 122 over implementations where CPU 122 is required to perform RTCP caching.

In performing its traditional role, network processor 110 receives packets associated with a communication session and routes the packets to a voice server module 104 assigned to the session or to another network interface 102, depending on whether transcoding is required. According to one exemplary implementation of the subject matter described herein, each network processor 110 offloads the collection and storage of session information from central CPU 122 and DSPs 118 and stores the session information in local cache memory 116.

For a VoIP-to-VoIP session, each network processor 110 may route packets associated with that session to another network processor, such as another network processor 112, for delivery to a destination, if transcoding is not required. However, for VoIP-to-TDM sessions that require transcoding, each network processor 110 may send packets to an assigned voice server module 104. For both types of sessions, packets received by a network processor 110 may be examined by RTCP caching module 114, which may store RTCP information contained in each packet and may update the stored information with information from a last received packet associated with the communication session. For example, for each received RTCP packet, RTCP caching module 114 may identify the session with which the packet belongs and may update the session information extracted from a previous packet associated with the session.

Figure 2:
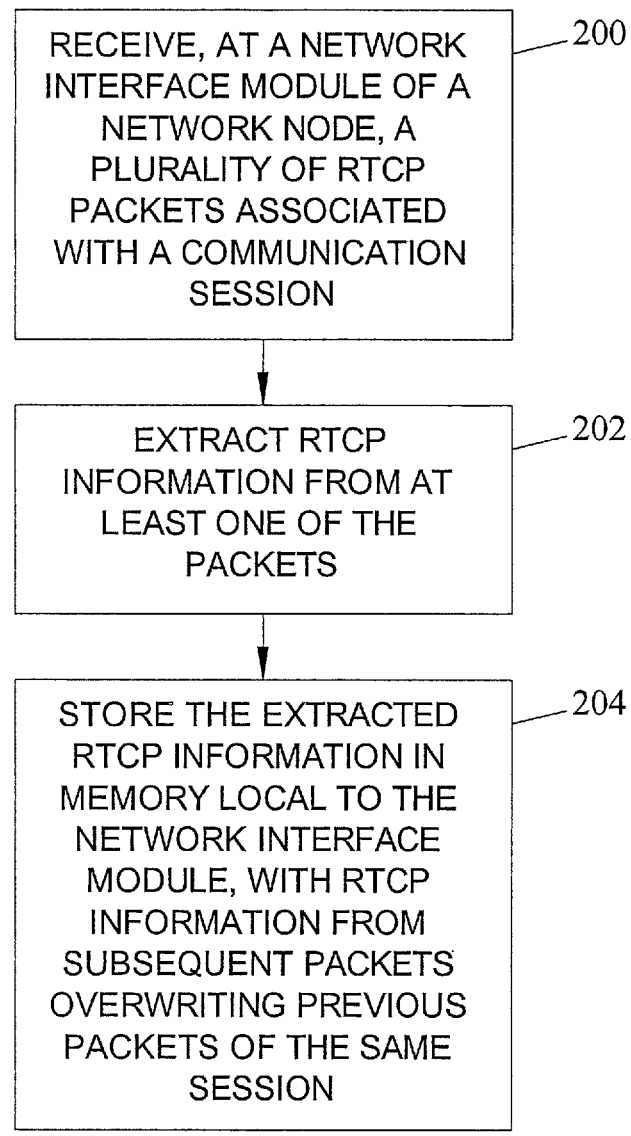
FIG. 2 is a flow chart illustrating a method for caching RTCP session information at the network interface module of an MG or an SBC according to an embodiment of the subject matter described herein.

FIG. 2 is a flow chart illustrating a method for caching session information at the network interface module of a network node, such as MG or an SBC, according to an embodiment of the subject matter described herein. In step 200, a network element, such as MG 100, receives a plurality of RTCP packets associated with a VoIP session. In step 202, RTCP information is extracted from at least one of the packets. In step 204, the extracted RTCP information is stored in memory local to the network interface module. Subsequent RTCP packets will overwrite previously stored RTCP information from previous packets of the same session.

Figure 3:
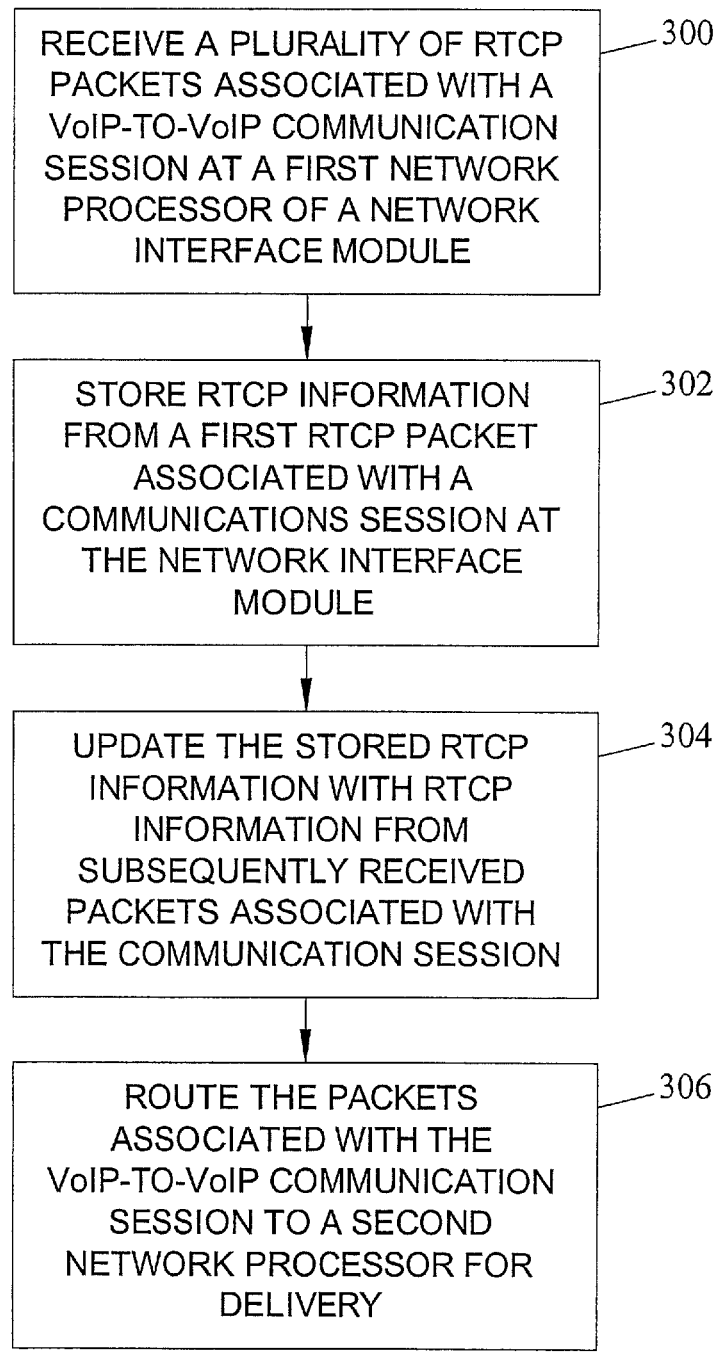
FIG. 3 is a flow chart illustrating a method for routing packets associated with a VoIP-to-VoIP communication session and caching session information at a network interface module according to an embodiment of the subject matter described herein.

FIG. 3 is a flow chart illustrating a method for routing packets for a VoIP-to-VoIP communication session and caching session information at a network interface module according to an embodiment of the subject matter described herein. VoIP-to-VoIP sessions may not require codec conversion, which is a function performed by DSPs 118. Therefore, if transcoding is not required and RTCP information is cached on the network interfaces, packets belonging to a VoIP-to-VoIP session can be routed from an incoming network processor to an outbound network processor without forwarding to DSPs 118.

Referring to FIG. 3, in step 300, a network element, such as MG 100, receives a plurality of RTCP packets associated with a VoIP-to-VoIP session. The RTCP information contained in a first packet of the plurality of packets is stored locally at the network interface module, as illustrated in step 302. This RTCP information is updated based on subsequently received packets associated with the session in step 304. The packets are routed to a second network processor for delivery without passing through the voice server card for unneeded processing, as illustrated in step 306.

Figure 4:
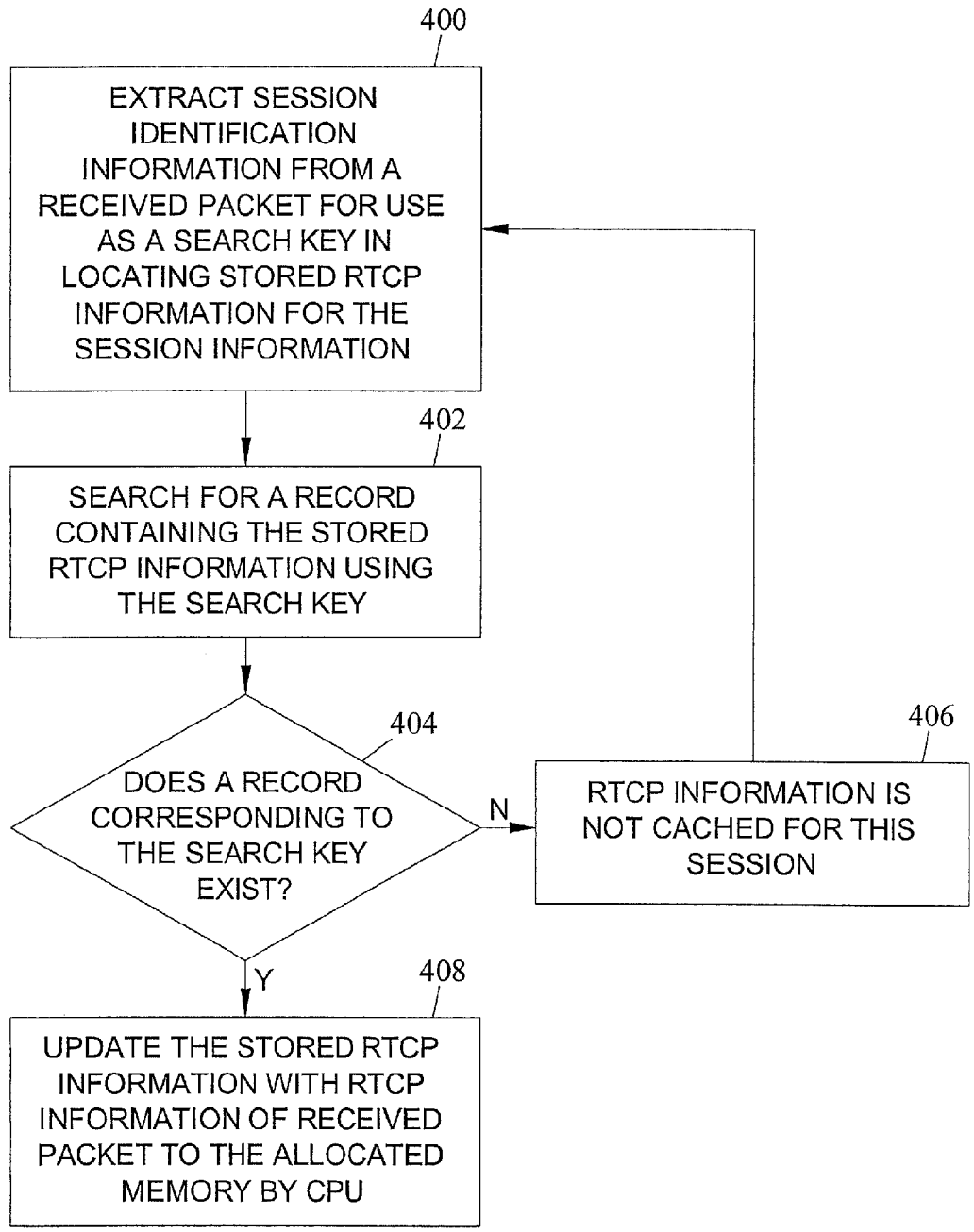
FIG. 4 is a flow chart illustrating a method for caching RTCP session information at a network interface module according to an embodiment of the subject matter described herein.

FIG. 4 is a flow chart illustrating a method for caching session information at a network interface of an MG or an SBC according to an embodiment of the subject matter described herein. Referring to FIG. 4, in step 400, once a packet is received by a network interface, session identification information is extracted from a received packet, which can include an Internet protocol (IP) address and a user datagram protocol (UDP) port number. The extracted session information becomes a search key that may be used to search cache 116 for stored RTCP information for the session in step 402. If it is determined, in step 404, that a record corresponding to the search key does not exist, then, in step 406, RTCP information will not be cached as this session is not provisioned to cache the RTCP information.

Returning to step 404, if, a record corresponding to the search key is found stored in memory, the RTCP information is updated with RTCP information from the received packet in step 412. This process is repeated for subsequent packets belonging to the same communications session because a record corresponding to search key will be found in memory until the session is terminated and the session information relating to that session is deleted from memory.

Local CPU 112 can determine whether a received packet is the final packet of a session. If the packet is the final packet, indicating that the session has ended, post-session processing, such as generating billing information can be performed.

Returning to FIG. 1, each RTCP cache 116 may be implemented using any suitable memory technology. Examples of suitably memory technologies that may be used include content addressable memory (CAM) and random access memory (RAM). CAM, also called associative memory or an associative array, is a more expensive form of memory than RAM but provides reduced search time. Because CAM enjoys a large speed advantage over RAM for data searches, it is commonly used in hardware network elements such as MGs and SBCs.

In CAM, rather than providing a memory location to retrieve desired data, a user provides a data word which is used to search the entire memory for instances of the data word, and a list is returned containing the locations of the data word. Each memory cell in CAM has an embedded "match circuit" allowing parallel searching of all cells simultaneously. Thus, CAM is searchable in a single operation, which allows data stored at any memory location to be accessed without prior knowledge of the data's address in memory. In order to perform this function, additional circuitry is required, creating trade-offs associated with the use of CAM, including increased expense and physical space requirements.

Alternatively, RAM is a slower but cheaper form of memory than CAM. RAM includes simple storage cells that store data organized by a memory address. In order to retrieve data stored in RAM, a user provides the memory location of the desired data, and the data stored at that location is returned. While all memory locations in RAM can be accessed with equal speed and in any sequence, RAM is not capable of searching its entire contents in a single operation. Moreover, because RAM lacks the "match circuitry" that exists in CAM, it cannot return data without prior knowledge of the data's address in memory.

For communication sessions, collecting and processing session information may be offloaded from remote processors and performed locally at the network interface module. For some communications sessions, such as those not requiring codec conversion, further offloading from remote processors can be achieved, as described herein.

Sessions not requiring any codec conversion, such as VoIP-to-VoIP calls where transcoding is not required, allow direct routing of packets without forwarding packets to a VSM 104. By eliminating VSM 104 from the network path for call sessions and by caching RTCP information locally at the network interface, network node resources, such as media gateway or SBC resources, are conserved.

For sessions requiring codec conversion, such as VoIP-to-TDM calls, packet payloads must still be sent to a VSM for conversion, yet session information can still be offloaded and locally cached by a network interface 102.

An advantage of the subject matter described herein includes reduced remote processor resources dedicated to collecting and storing session information for each communication session by offloading this task to a local CPU and cache memory located on the network interface module with the network processor. Reduced processing requirements on the central CPU and DSPs allows these processors to better perform their primary functions, their primary functions being call set-up and tear-down and codec conversion respectively.

In the example illustrated in FIG. 1, the subject matter described herein is implemented in a media gateway. In an alternate implementation, the subject matter described herein can be implemented in a session border controller (SBC). An exemplary SBC includes the T9000 by Tekelec, of Calabasas, Calif.

It will be understood that various details of the invention may be changed without departing from the scope of the invention. Furthermore, the foregoing description is for the purpose of illustration only, and not for the purpose of limitation.

What is claimed is:

1. A method for storing communication session information at a network interface module, the method comprising:
   receiving, at a network interface module of a network node, a plurality of real time transport control protocol (RTCP) packets associated with a communication session;
   extracting, using a network processor at the network interface module, RTCP information from at least one of the RTCP packets;
   storing, using the network processor at the network interface module, the extracted RTCP information in memory located at the network interface module; and
   using the network processor to forward incoming packets to an appropriate voice server module of a plurality of voice server modules and to forward outbound media packets over a communications network.

2. The method of claim 1 wherein receiving a plurality of RTCP packets associated with a communication session includes receiving the plurality of RTCP packets associated with the communication session at a media gateway.

3. The method of claim 2 wherein receiving the plurality of RTCP packets associated with the communication session at the media gateway includes receiving the plurality of RTCP packets associated with the communication session at an Internet protocol (IP) network interface module of the media gateway.

4. The method of claim 1 wherein receiving the plurality of RTCP packets associated with the communication session includes receiving the plurality of RTCP packets associated with the communication session at a session border controller (SBC).

5. The method of claim 1 wherein receiving the plurality of RTCP packets associated with the communication session includes receiving RTCP packets associated with a voice over Internet protocol (VoIP)-to-VoIP call session, and further comprising routing the RTCP packets from the network interface module to another network interface module in the network node in a manner that bypasses a voice server module in the network node.

6. The method of claim 1 wherein receiving the plurality of RTCP packets associated with the communication session includes receiving packets associated with a voice over Internet protocol (VoIP)-to-time division multiplexing (TDM) call session and further comprising forwarding the packets to a voice server module in the network node.

7. The method of claim 1 wherein storing the extracted RTCP information comprises:
   allocating memory associated with the network interface module for the communication session; and
   writing the extracted RTCP information to the allocated memory.

8. The method of claim 1 wherein storing the extracted RTCP information includes allocating storage space in random access memory (RAM) of the network interface module.

9. The method of claim 1 wherein storing the extracted RTCP information includes allocating storage space in content addressable memory (CAM) of the network interface module.

10. The method of claim 1 wherein storing the extracted RTCP information comprises:
    extracting session identification information from the at least one RTCP packet for use as a search key for locating a record in the memory allocated to store RTCP information from the RTCP packet;
    searching the memory using the search key; and
    in response to locating a record corresponding to the search key, updating RTCP information stored in the record with the extracted RTCP information.

11. The method of claim 10 wherein extracting session identification information from the at least one RTCP packet includes extracting an Internet protocol (IP) address and a user datagram protocol (UDP) port number.

12. The method of claim 1 wherein storing the extracted RTCP information comprises storing at least one of a sender's packet count, the sender's octet count, a fraction of packets lost, a cumulative number of packets lost, and packet interarrival jitter.

13. A system for storing communication session information, the system comprising:
    a network node including:
      a plurality of voice processing resources for processing voice packets associated with communications sessions and for sending real time transport control protocol (RTCP) packets to and receiving RTCP packets from a network; and
      a plurality of network interface modules for sending the voice and RTCP packets to and receiving the voice and RTCP packets from the network, wherein at least one of the network interface modules includes an RTCP caching module for extracting, using a network processor at the network interface module, RTCP information from at least one of the RTCP packets, for storing, using the network processor at the network interface module, the extracted RTCP information in memory located at the network interface module, wherein the network processor is configured to forward incoming packets to an appropriate voice server module of the plurality of voice server modules and to forward outbound media packets over a communications network and an RTCP cache for caching RTCP information from the received RTCP packets, wherein the RTCP cache includes the memory located at the network interface module.

14. The system of claim 13 wherein the network node comprises a media gateway.

15. The system of claim 13 wherein the network node comprises a session border controller (SBC).

16. The system of claim 13 wherein the at least one of the network interfaces comprises an Internet protocol (IP) network interface.

17. The system of claim 13 wherein the at least one of the network interfaces is adapted to receive and route packets associated with a voice over Internet protocol (VoIP)-to-VoIP call session that does not require transcoding to another of the network interfaces in a manner that bypasses the voice processing resources.

18. The system of claim 13 wherein the at least one of the network interfaces is adapted to route packets associated with a voice over Internet protocol (VoIP)-to-time division multiplexing (TDM) call session that requires transcoding to one of the voice processing resources.

19. The system of claim 13 wherein the RTCP caching module is adapted to:
  allocate memory in the RTCP cache for at least one of the communication sessions; and
  write the RTCP information from at least one of the RTCP packets to the allocated memory.

20. The system of claim 13 wherein the RTCP cache comprises a random access memory (RAM).

21. The system of claim 13 wherein the RTCP cache comprises a content addressable memory (CAM).

22. The system of claim 13 wherein the RTCP caching module is adapted to:
  extract session identification information from one of the received RTCP packets for use as a search key for locating a record in the RTCP cache for storing RTCP information for a session; and
  in response to locating a record using the search key, to update RTCP information stored in the record with RTCP information extracted from the one received RTCP packet.

23. The system of claim 22 wherein the RTCP caching module is adapted to extract an Internet protocol (IP) address and a user datagram protocol (UDP) port number from the one received RTCP packet for use as the session key.

24. The system of claim 22 wherein the RTCP caching module is adapted to, in response to failing to locate the stored RTCP information, allocate space in the RTCP cache and store the RTCP information extracted from the one RTCP received packet in the allocated space.

25. The system of claim 13 wherein the RTCP caching module is adapted to store at least one of a packet sender's packet count, the packet sender's octet count, and a fraction of packets lost, a cumulative number of packets lost, and packet interarrival jitter for the RTCP packets in the RTCP cache.

26. The system of claim 13 comprising a central processing unit (CPU) for controlling overall operation of the network node, wherein the RTCP caching module and the RTCP cache are located at the at least one of the network interfaces and separate from the CPU.

27. A non-transitory computer program product comprising computer executable instructions embodied in a non-transitory computer readable medium for performing steps comprising:
  receiving, at a network interface module of a network node, a plurality of real time transport control protocol (RTCP) packets associated with a communication session;
  extracting, using a network processor at the network interface module, RTCP information from at least one of the RTCP packets;
  storing, using the network processor at the network interface module, the extracted RTCP information in memory located at the network interface module; and
  using the network processor to forward incoming packets to an appropriate voice server module of a plurality of voice server modules and to forward outbound media packets over a communications network.

* * * * *